(12) United States Patent
Zeuner et al.

(10) Patent No.: US 7,290,739 B2
(45) Date of Patent: Nov. 6, 2007

(54) CLAMP SUPPORT

(75) Inventors: Lutz Zeuner, Hardebek (DE);
Hans-Peter Guthke, Buxtehude (DE);
Lueder Kosiankowski, Jork (DE);
Hans-Georg Plate, Roseburg (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/072,217

(22) Filed: Mar. 4, 2005

(65) Prior Publication Data

US 2005/0204519 A1 Sep. 22, 2005

Related U.S. Application Data

(60) Provisional application No. 60/598,237, filed on Aug. 3, 2004.

(30) Foreign Application Priority Data

Mar. 8, 2004 (DE) ............... 10 2004 011 182

(51) Int. Cl.
*F16L 3/22* (2006.01)

(52) U.S. Cl. ............... 248/68.1; 248/71; 248/229.11

(58) Field of Classification Search ........... 248/229.11, 248/68.1, 229.21, 228.2, 230.2, 56, 72, 231.31, 248/71; 403/318, 374.1, 374.2; 24/268, 24/136 R, 115 M, 171, 194, 477
See application file for complete search history.

(56) References Cited

U.S. PATENT DOCUMENTS

| | | | | |
|---|---|---|---|---|
| 3,734,549 A | * | 5/1973 | Loov | 403/75 |
| 4,032,101 A | * | 6/1977 | Immordino | 248/231.31 |
| 4,513,474 A | * | 4/1985 | Watabe | 16/243 |
| 4,606,216 A | * | 8/1986 | Riutta | 72/422 |
| 4,815,719 A | * | 3/1989 | Peters et al. | 269/130 |
| 4,846,803 A | * | 7/1989 | Emerson | 604/263 |
| 4,979,945 A | * | 12/1990 | Wade et al. | 604/192 |
| 5,310,151 A | * | 5/1994 | Engel | 248/230.8 |
| 5,546,724 A | * | 8/1996 | Reinklou | 52/698 |
| 5,702,081 A | * | 12/1997 | Gallemore, II | 248/218.4 |
| 6,224,451 B1 | * | 5/2001 | Lai | 446/34 |

FOREIGN PATENT DOCUMENTS

GB 1 564 584 4/1980

* cited by examiner

*Primary Examiner*—Korie Chan
(74) *Attorney, Agent, or Firm*—Lerner, David, Littenberg, Krumholz & Mentlik, LLP

(57) ABSTRACT

A clamp support for holding and guiding a cable loom has a basic element and a wedge, which can be shifted relative to the basic unit to clamp the basic unit to a structural component. While clamping the basic unit with the structural component, the wedge is arranged in a position between the basic unit and structural component to reflect the width of the transverse carrier.

10 Claims, 4 Drawing Sheets

CLAMP SUPPORT

This application claims the benefit of the filing date of U.S. Provisional Patent Application No. 60/598,237 filed Aug. 3, 2004, the disclosure of which is hereby incorporated herein by reference.

BACKGROUND OF THE INVENTION

The invention relates to clamp supports. In particular; the invention relates to cable supports, for holding and guiding electrical cable bundle, lines and pipes (water, climate, etc.) in airplanes.

In aircraft, cable supports made of plastic are preferably used due to their low intrinsic weight. In this case, the supports are each tailored to specific connection conditions of a structural component, such as a carrier or frame, etc. Such connection conditions include the thickness of transverse carrier webs, bore diameter or the like.

One disadvantage to known cable supports is that changes in the carrier thickness of a carrier (e.g., transverse carrier) result in cost and time-intensive changes in the supports, since the injection molding tools must be altered accordingly to manufacture the supports.

SUMMARY OF THE INVENTION

According to an exemplary embodiment of the invention, a clamp support is provided, hereinafter also referred to as cable support, which comprises two parts, a basic unit and a wedge, which are interconnected by means of an joining element (e.g., screw, cable binder, etc.). The support or clamp is inserted into an installation hole of a transverse carrier and fixed with the wedge placed on the basic unit and a loose cable binder. The wedge is drawn upward using the cable binder until it hits the stop (wedge-web carrier/ transverse carrier bearing surface). In this case, it may move toward the top on two guide strips. The wedging effect may hold the support in place.

According to an exemplary embodiment of the invention, a clamp support is provided that covers a portion of changes in carrier thickness, and can hence be flexibly used for several different carrier thicknesses.

The wedge may move along an inclined plane at an angle α relative to the web. Depending on the web thickness (width), the wedge clamps at varying heights. The joining element and suitable surface structure of the wedge prevent a spontaneous detachment.

The wedge structure and corresponding design of the basic unit make it possible to use the cable support for different carriers (web thicknesses). For example, five supports (e.g., five injection molded tools) would normally be required for guiding a bundle of lines through the eyelets of a transverse carrier with thicknesses of 2 mm, 2.5 mm, 3 mm, 4.5 mm, while an exemplary embodiment of the invention necessitates only one support accordingly designed to cover carrier widths of 2 to 4.6 mm. This yields a significant savings in tool costs, in particular for injection-molded tools, and reduces the number of components per carrier thickness.

Exemplary embodiment of the invention will be explained below, drawing reference to the attached drawings. The same reference numbers denote the same elements in the figures.

DETAILED DESCRIPTION

Figure 1:
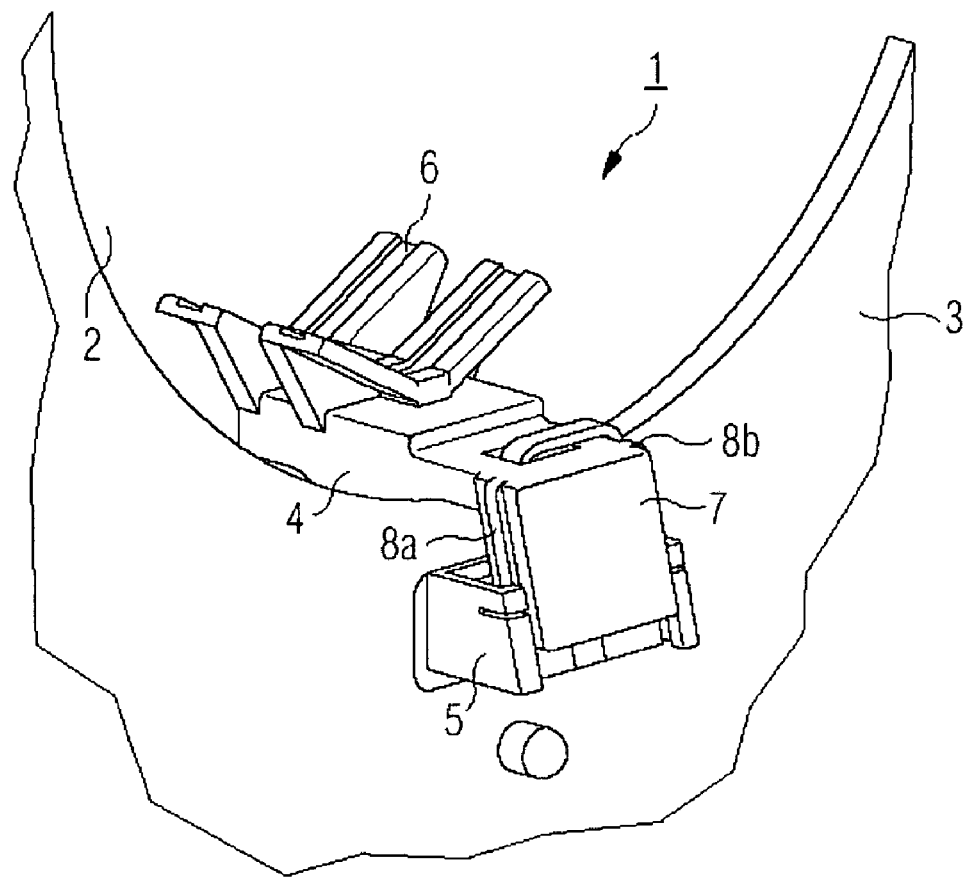
FIG. 1 is a perspective view of a cable support according to an exemplary embodiment of the invention secured to a carrier.

FIG. 1 shows a perspective view of a cable support 1 according to an exemplary embodiment of the invention.

The cable clamp 1 is secured in an eyelet 2 of a transverse carrier 3, e.g., in order to support the lines running through the eyelet 2.

The cable clamp 1 has a basic unit 4 and a wedge 5.

As shown on FIG. 1, two V-shaped cable guides 6 are formed on a side facing the eyelet 2 of the transverse carrier 3 according to the exemplary embodiment. These cable guides may be integrated with the basic unit. As an alternative, however, they can be attached or slipped on, and have a different shape.

On the side of the transverse carrier 3 accommodating the wedge 5, the basic unit 4 has a web 7 extending away from the eyelet 2, which web 7 is preferably integrated with the basic unit 4.

The lateral surfaces of the web 7 each have guide rails 8a, 8b, which guide the wedge 5 while it is pushed from the bottom up in the figure between a surface of the transverse carrier 3 and the web 7 of the basic unit 4. Pushing the wedge 5 in the figure from the bottom up along the guide rails 8a, 8b of the web 7 exerts a clamping effect depending on the thickness (width) of the transverse carrier 3 when the wedge 5 is inserted far enough between the surface of the transverse carrier 3 and an inside surface of the web 7.

According to the exemplary embodiment, the side of the wedge 5 facing the transverse carrier 3 is completely in contact with the transverse carrier 3 with the cable support fixed in place (i.e., when the cable support 1 is securely clamped with the transverse carrier 3), in order to ensure a reliable clamping.

Figure 2A:
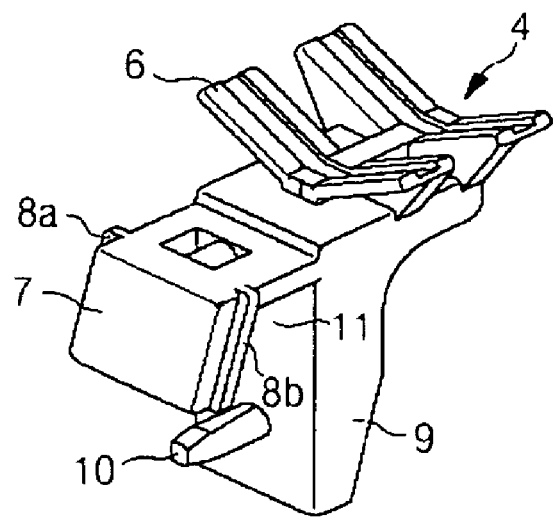
FIG. 2a is a perspective view of a basic unit of the cable support according to FIG. 1.
Figure 2B:
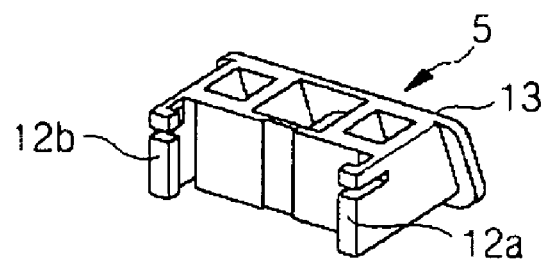
FIG. 2b is a perspective view of a wedge of the cable support according to FIG. 1.
Figure 2C:
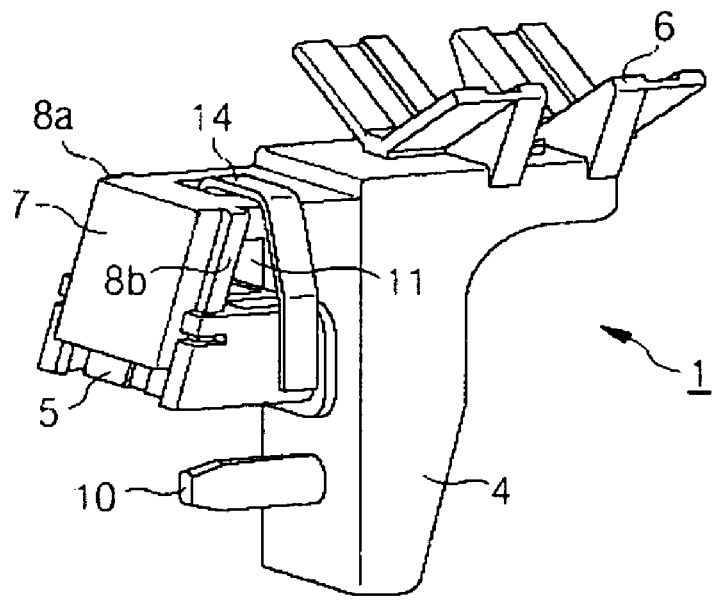
FIG. 2c is a perspective view of a cable support according to FIG. 1, separated from the carrier.

FIG. 2a to 2c show the cable support 1 according to FIG. 1 demounted into its individual components, and after assembled.

FIG. 2a shows the basic unit 4 of the cable support 1 according to the invention. As shown on FIG. 2a, the basic unit 4 has a projection 9, which is essentially longer in design than the web 7. One end area of the projection 9 has a pin 10 on the surface that essentially extends perpendicularly away from the projection 9 in the direction of the web 7. The web 7 and projection 9 are arranged relative to each other in such a way as to generate a space 11 between them serving to accommodate the transverse carrier 3 according to FIG. 1. FIG. 2a also shows the guide rails 8a and 8b formed on lateral surfaces of the web 7. According to the exemplary embodiment, the projection 9 extends essentially perpendicularly away from the basic unit 4, and the web 7 preferably extends away from the basic unit 4 at an angle. Hence, the projection 9 and the web 7 may be not parallel to each other.

FIG. 2b shows the wedge 5 with wedge guide rails 12a, 12b, which are designed according to the guide rails 8a, 8b of the web 7 to be guided therein.

The wedge 5 may be designed as a single piece, e.g., fabricated via injection molding technology. The side of the wedge 5 facing away from the wedge guide rails 12a, 12b has a surface 13 that is in contact with a surface of the transverse carrier 3 when the cable support 1 is clamped to the transverse carrier 3. The wedge surface 13 preferably is structured in such a way as to prevent the cable support 1 from spontaneously detaching, or the rigidly fixed wedge 5 from slipping out.

FIG. 2c shows the basic unit 4 according to FIG. 2a with wedge 5 according FIG. 2b slipped on. As evident from FIG. 2c, a joining element 14, e.g., a cable binder, is additionally provided to prevent the wedge 5 from sliding out of the guide rails 8a, 8b of the web 7, e.g., due to vibrations, and lifting a clamping effect on the transverse carrier 3. Other joining elements are possible, e.g., screws, pins, etc.

Figure 3:
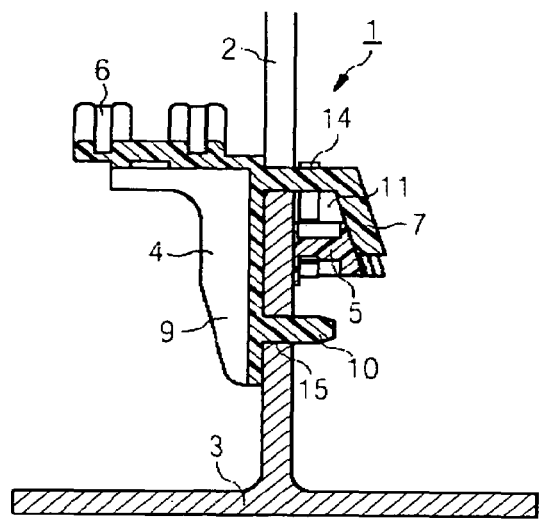
FIG. 3 is a cross section of the cable support secured to the carrier according to FIG. 1.

FIG. 3 shows a cross sectional view of the cable support 1 secured to the carrier 3 according to FIG. 1.

As evident from FIG. 3, the pin 10 of the basic unit 4 extending away from the projection 9 is inserted through an installation hole 15 formed in the transverse carrier 3 with the cable support 1 in an assembled state. The pin 10 is a molded-on, split wedge pin according to the exemplary embodiment. The installation hole 15 can be used to easily fix the cable support 1 in a specific position.

As shown on FIG. 3, an end area of the transverse carrier 3 facing the transverse carrier eyelet 2 is located inside the space 11 defined by the projection 9 and the web 7. In this case, an essentially flat surface of the projection 9 is in complete contact with the surface of the transverse carrier 3.

The wedge 5 is introduced into the space 11 in FIG. 3, and with the cable support 1 clamped with the transverse carrier 3, the surface 13 of the wedge 5 is essentially in contact with a surface of the transverse carrier 3 lying opposite the surface of the transverse carrier that contacts the surface of the projection 9. With the cable support 1 securely fixed to the transverse carrier 3, the wedge 5 is additionally secured with a cable binder 14 in the exemplary embodiment to prevent the wedge 5 from unintentionally detaching, i.e., slipping out.

Figure 4A:
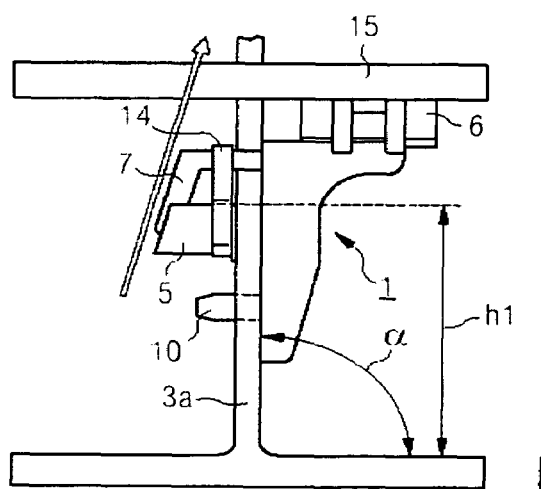
FIG. 4a is a side view of the cable support according to FIG. 1, secured to a first carrier.

FIG. 4a shows a side view of the cable support 1 in a state secured to a first transverse carrier 3a.

In order to arrive at the clamped state of the cable support 1 shown on FIG. 4a, the cable support 1 with secured wedge 5 and detached cable binder 14 is inserted and fixed in the installation hole 15 of the transverse carrier 3a. Fixation takes place with the molded-on, split wedge pin 10. The wedge 5 is then pulled up with the cable binder 14, i.e., until the surface 13 of the wedge 5 tightly abuts the transverse carrier 3a. The wedge 5 here moves along the guide rails 8a, 8b, which are laterally formed on web 7, as described above. The wedging effect and latching cam or stop cam on the side of the basic unit fixes the support in place.

Hence, the wedge moves along an inclined plane at an angle $\alpha$ relative to web 7, and becomes fixed in place at a varying height, depending on the web thickness 3a. In the case shown on FIG. 4, the wedge 5 is fixed at height h1, for example.

Figure 4B:
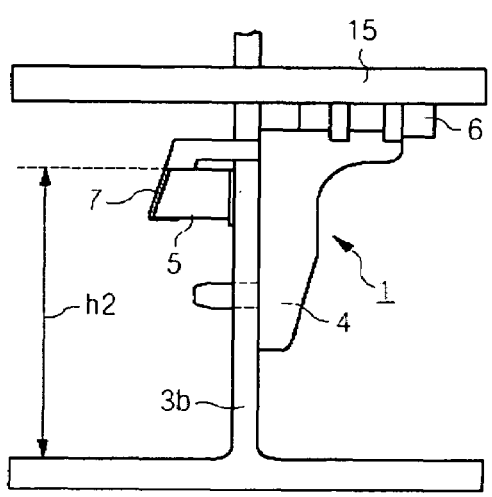
FIG. 4b is a side view of the cable support according to FIG. 1, secured to a second carrier.

For comparison purposes, FIG. 4b shows a transverse carrier 3b that is less wide than the transverse carrier 3a shown on FIG. 4a. Therefore, the web of the transverse carrier 3b according to FIG. 4b is less thick than the web of the transverse carrier 3a shown on FIG. 4a.

As clearly evident from FIG. 4b, the wedge 5 is also moved up at an angle $\alpha$ relative to the web according to the invention, wherein the wedging effect only sets in significantly later than for the transverse carrier 3a according to FIG. 4a. The cable support 1 only becomes clamped or fixed in place at height h2, which exceeds height h1 according to FIG. 4a.

Hence, the wedge according to the invention becomes clamped at varying heights depending on the web thickness.

FIGS. 4a and 4b each show a cable 16 supported and guided by the cable support according to the invention.

Figure 5:
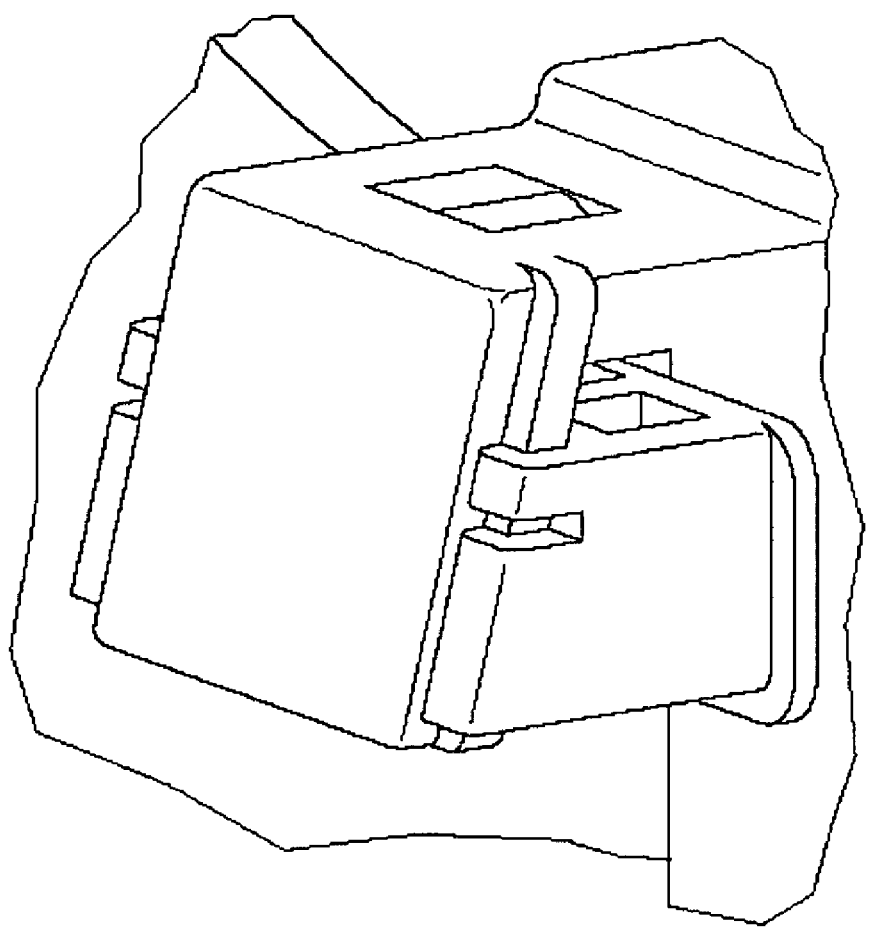
FIG. 5 is a magnified perspective view of the cable support according to FIG. 1.

FIG. 5 shows a perspective view of the web 7 of the basic unit 4 of the cable support 1.

In FIG. 5, the wedge 5 is directed along the guide rails 8a and 8b of web 7, and arranged within the space 11 formed between the web 7 and projection 9.

Even though the invention was described above drawing reference to an exemplary embodiment, it goes without saying that the person skilled in the art can introduce changes and modifications in this area without departing from the scope of protection of the invention. Further, it goes without saying for an expert in this area that the cable support according to the invention can also be used in other areas than aircraft construction, e.g., in automobiles, or where reliably mounting and guiding cable looms or lines is important. The support according to the invention can also be used to mount and guide not just cables, cable looms and the like, but also pipes and tubes or other objects.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A clamp adapted to be clamped to a structural component, said clamp comprising:
   a basic unit;
   a projection having a first projection surface, said projection extending essentially perpendicularly to said basic unit;
   a web having a first web surface, said web extending from said basic unit such that said first projection surface generally faces said first web surface;
   a pin extending from said first projection surface; and,
   a wedge;
   wherein said clamp may be placed against a structural component such that said pin enters an installation hole in said structural component, said first projection surface abuts said structural component, and said wedge fits between said structural component and said first web surface to secure said clamp to said structural component.

2. The clamp of claim 1, wherein said wedge fits between said structural component and said first web surface in a friction fit.

3. The clamp of claim 1, further comprising a cable guide associated with said basic unit, said cable guide adapted to support cables.

4. The clamp of claim 1, wherein said first web surface is inclined from said first projection surface.

5. The clamp of claim 1, wherein said basic unit and wedge are secured together by a joining element to prevent the wedge from, moving relative to the basic unit.

6. A clamp adapted to clamp to an eyelet of a transverse carrier, said clamp comprising:
   a basic unit;
   a projection having a first projection surface, said projection extending essentially perpendicularly to said basic unit;
   a web having a first web surface, said web extending from said basic unit such that said first projection surface is at an angle to said first web surface;
   a pin extending from said first projection surface; and,
   a wedge having a front and a back, said front configured to generally face said first projection surface and said back configured generally at said angle to said front such that said back generally faces said first web surface;
   wherein said clamp has a first condition in which said clamp may be placed within said eyelet of said transverse carrier such that said pin enters an installation hole in said transverse carrier, said first projection surface abuts said transverse carrier, and said wedge fits with its front against said transverse carrier and its back against said first web surface, and a second condition in which said wedge is shifted relative to said web to secure said clamp to said transverse carrier.

7. The clamp of claim 6, further comprising a cable guide associated with said basic unit, said cable guide adapted to support cables.

8. The clamp of claim 6, wherein said basic unit and wedge are secured together by a joining element to prevent the wedge from moving relative to the basic unit.

9. The clamp of claim 8, wherein said joining element is a cable binder.

10. The clamp of claim 9, wherein said clamp may be clamped to transverse carriers of varying width.

* * * * *